UNITED STATES PATENT OFFICE.

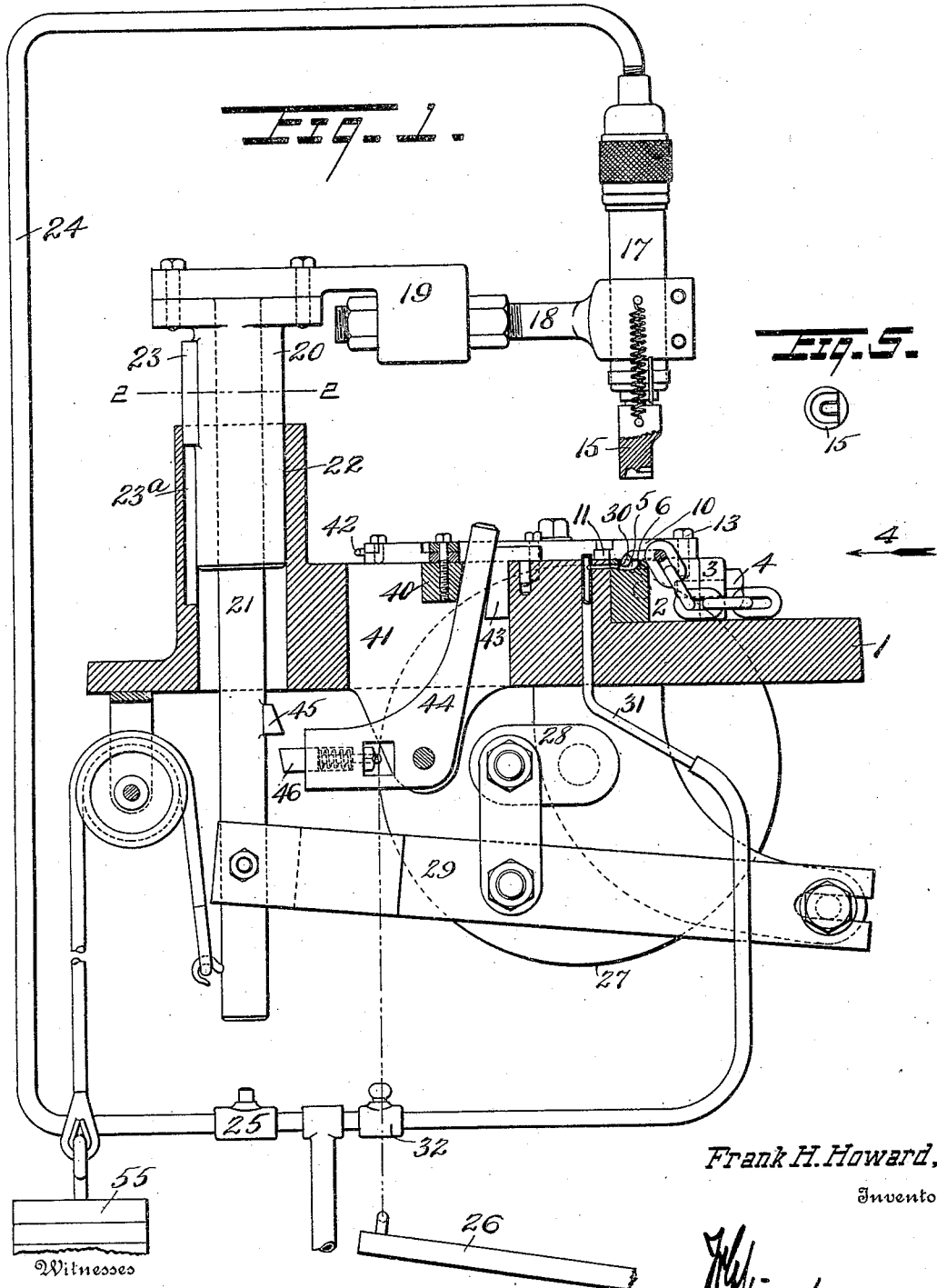

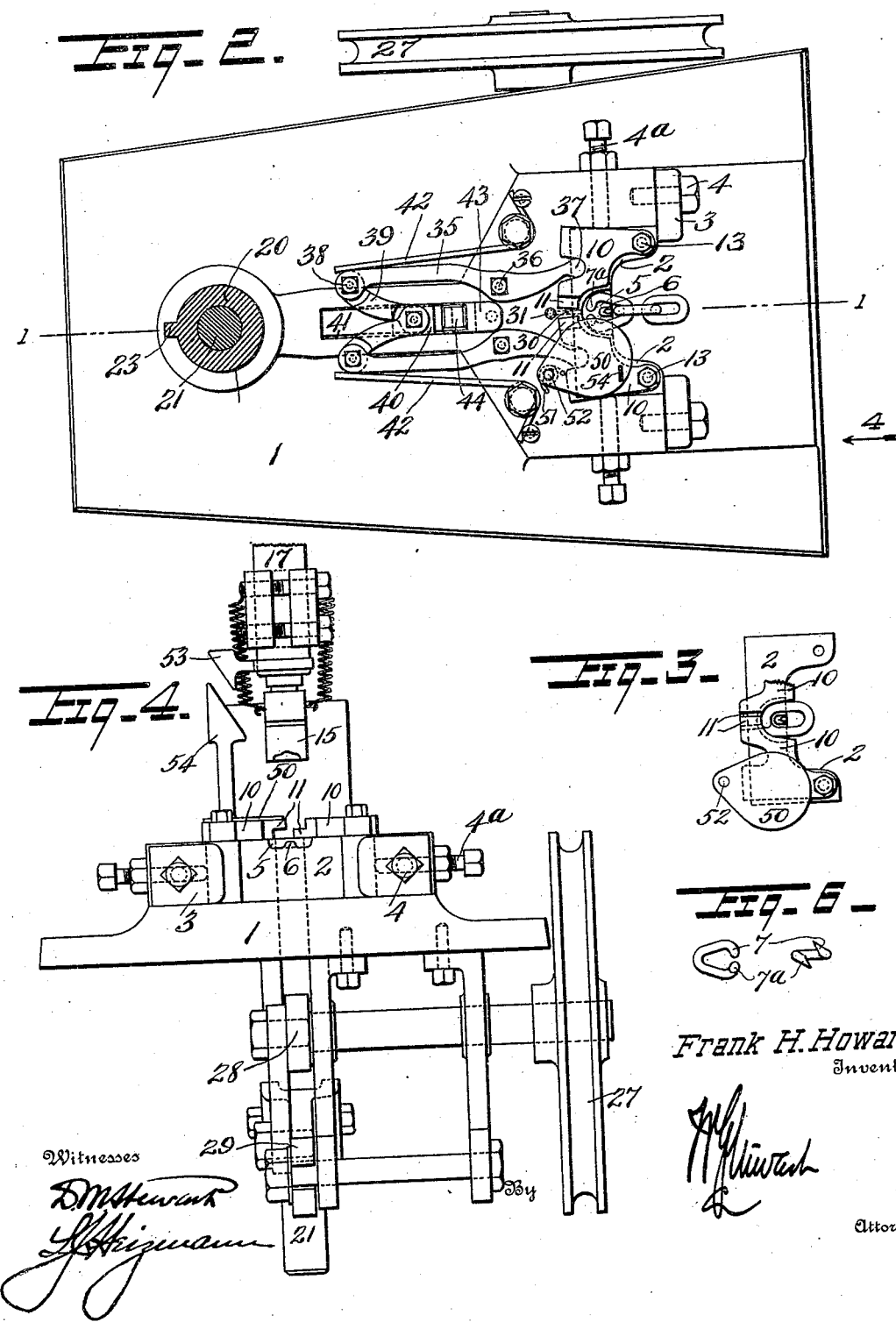

FRANK H. HOWARD, OF BROOKSIDE, NEAR READING, PENNSYLVANIA.

CHAIN-WELDING MACHINE.

938,056.   Specification of Letters Patent.   Patented Oct. 26, 1909.

Application filed July 22, 1908. Serial No. 444,703.

*To all whom it may concern:*

Be it known that I, FRANK H. HOWARD, a citizen of the United States, and a resident of Brookside, near Reading, in the county of Berks and State of Pennsylvania, have invented certain new and useful Improvements in Chain-Welding Machines, of which the following is a specification.

My invention relates particularly to chain-welding machines, and it consists in improved mechanism for closing together the link-ends, for maintaining the latter at proper welding heat, and for satisfactorily effecting the welding operation, as hereafter fully described, the novel features being specifically pointed out in the subjoined claims.

Figure 1 is a longitudinal sectional view of a machine embodying the several features of my invention in preferred form and arrangement, the section being on the line 1—1 of Fig. 2. Fig. 2 is a plan view of the same, the hammer mechanism being cut away on the line 2—2 of Fig. 1. Fig. 3 is a separate plan view showing the end-closing fingers closed together upon a link on the anvil die preliminary to the hammering operation. Fig. 4 is an end elevation looking in the direction of arrow 4, Figs. 1 and 2. Fig. 5 is a bottom view of the hammer die. Fig. 6 shows a link blank in plan and end views.

The frame-bed 1 is formed with a depression or recess in its upper face in which is located the anvil-die 2, which is removably secured, as shown, by clamps 3 and bolts 4 4ª. This anvil die is formed with a recess 5 in its upper face, for the reception of the end portions of each link to be welded; and a link-engaging horn 6 rises from said recessed surface, within the placed link. The form of the link blank to be operated upon, as indicated in Fig. 6, is such as is commonly employed, with separated ends 7, 7ª, adapted to be overlapped around said horn 6 preparatory to the welding operation. This overlapping is effected by means of a pair of laterally movable end-closing fingers 10, 10, which are formed with overlapping hooked ends 11, 11, adapted to engage the respective link-ends 7, 7ª, and to close them together; said fingers, as shown, being pivoted upon the anvil die 2 at points 13, 13, in front of the anvil horn 6, so as to swing somewhat toward the latter in their closing-together movement; the means for effecting which movement will be hereafter described. The welding of the overlapped link ends is effected as usual by a hammer-die 15, which is so shaped as to coöperate with the horned anvil-die 2 in uniting said ends and properly shaping the link. This hammer-die, which is loosely carried at the end of the hammer cylinder as indicated is struck by the piston-rod of the pneumatic cylinder 17, in well known manner, and is moved with the latter toward and away from the anvil die. When brought into contact with the placed link, the latter is firmly held by it in the anvil die so as to insure its being formed straight and true during the welding operation, which is then effected by short rapid hammer strokes upon the seated die. As shown the cylinder 17 is secured to a horizontal carrier-arm 18, 19, which is fixed to a carrier-column 20, 21, vertically movable in a guide-way 22 in the frame; the length of said carrier-arm being preferably made adjustable as shown, to permit of readily changing dies and of setting the hammer-die 15 to suit the coöperating fixed die; and the carrier-column being arranged to normally insure a vertical movement of the hammer cylinder relative to the anvil die, but made capable of a swinging movement by raising its feather 23 free of the guide-way groove 23ª so as to permit of throwing the hammer mechanism laterally out of the way when it is desired to have free access to the fixed die or frame bed. The hammer piston is operated by compressed air furnished through a suitable conduit 24, which latter is provided with a controlling valve 25 for the hammer; said valve being so arranged as to be automatically opened by the final movement of the hammer-carrying column 21 when operated, as shown, by the treadle 26 through chain-wheel 27, crank connection 28, and lever 29.

To insure a perfect welding of the metal ends it is essential that the latter be maintained at a perfect welding heat, which is ordinarily a matter of considerable difficulty and uncertainty, and the failure of which involves the great danger of concealed defects as well as increased cost. The metal must not be overheated on removal from the furnace, and more or less loss of heat is unavoidable before the hammering operation takes place, so that the only effective way to insure a proper temperature for the latter is to positively reheat the metal after it has been properly placed. This I accomplish by providing an air nozzle 30, so located as to discharge as indicated upon the metal on the anvil die at the point of welding, and connecting said nozzle with a conduit 31 for compressed air; which conduit, as shown, is a branch from the main conduit supplying compressed air to the pneumatic hammer, and is provided with a separate controlling valve 32 as desired. The properly regulated jet of compressed air thus discharged upon the heated metal in welding position on the die, serves to reheat it so as to insure a proper weld, while at the same time serving to remove the loosened scale. As the hammer die is seated upon the placed link to weld it, the air nozzle 30 is closed thereby.

The mechanism for operating the end-closing fingers 10, 10, comprises, as shown, a pair of levers 35 pivoted intermediately to the frame at 36, and having their forward ends 37 engaging said fingers and their rearward ends 38 connected by toggle levers 39 to a central sliding-block 40 guided in a frame-slot 41; said lever ends 38 being normally pressed together by separate springs 42 so as to move apart the fingers 10 a determined distance as regulated by the stop-key 43 inserted in said slot 41; or being spread against the tension of said springs 42 by the movement of an operating lever 44 one arm of which engages said sliding block 40. The operating movement of this lever 44 is effected as shown, by contact therewith of a projection 45 on the vertically moving part 21 of the hammer-carrying mechanism; said projection being adapted, as indicated, to engage a spring-backed trigger device 46 adjustably mounted in the free end of the operating-lever 44 so as to normally project into its path. The downward movement of said projection 45 is thus caused to tilt sai dlever a determined distance (as fixed by endwise adjustment of the trigger device 46) to properly close the fingers 10, 10; while its upward movement, after operating the conduit valve to effect the welding, is not interfered with by the trigger-device 46, as the latter is momentarily pressed out of its path owing to the yielding of the trigger-device spring.

In placing a heated link for closing and welding it, the fingers 10, 10, are spread as indicated in Figs. 1 and 2, and the ends 7, 7ª, of the link require to be so placed as to be engaged by the respective overlapping ends 11, 11, of the fingers. To facilitate the accurate placing of the link in such position, I preferably provide a movable guard-plate 50, overlying one of said fingers 10, against the bottom surface of which the raised end 7 of the link is upwardly pressed by the operator in placing it for closing and welding, thereby insuring the location of each link end 7, 7ª, in proper plane for engaging the respective overlapping finger ends 11, 11, during the closing action of the fingers. This guard-plate 50 is normally pressed into operative position by a spring 51 on the pivot axis 52, and is pushed out of the way when no longer needed, by the descent of the hammer-die, which latter is provided, as shown, with a wedge-like projection 53 adapted to engage a riser 54 on said plate so as to effect this purpose. When the heated link has been placed as described for action of the closing fingers 10, 10, the hammer-carrying column 20, 21, which is normally raised by weight 55 as shown, is simply depressed by operation of the lever 29 to successively effect the closing and welding of the link: The projection 45 on said column first tilting the lever 44 a determined distance to properly effect the closing of the link ends by the fingers 10, 10; then immediately permitting the respreading of said fingers by action of the springs 42; and finally simultaneously seating the hammer die upon the closed link and opening the conduit valve 25 to cause rapid reciprocation of the hammer-piston upon the hammer die. Additional effects of this simple lowering movement of the hammer cylinder with the column 20, 21, are, first, to cause the heated link to drop into the anvil die immediately after its ends are closed by the closing fingers, thus bringing said heated ends into contact with the compressed air discharged from nozzle 30 and thereby subjecting these link ends for a brief period of time to the reheating action of said jet; and second, to automatically cut off said jet from further action upon the link ends by interposing the hammer die which practically closes said nozzle in seating upon the link for welding. The period of time thus allowed for the reheating action of the regulated air jet is sufficient to insure a proper welding temperature without burning the metal. The welding and shaping of the link between the dies is quickly effected by the rapid automatic operation of the hammer, which is promptly withdrawn with its die by the weight 55, thereby returning the parts to position for a repetition of the operation. The air jet may be shut off at the valve 32 between the welding operations, but has no heating effect upon the cooled link after the dying action and serves to clean the anvil die of loose scales before a succeeding operation.

The mechanism particularly shown and described may obviously be modified within the spirit of the invention as pointed out in the claims.

What I claim is:—

1. A link-welding machine comprising an anvil-die, a hammer-die and jointly movable operating cylinder and piston therefor, a valve controlled conduit to said cylinder, laterally movable end-closing devices, mechanisms for opening and closing said devices and for opening said conduit valve and means for successively operating said mechanisms during each die-seating movement of the hammer cylinder.

2. A link-welding machine comprising an anvil-die, a hammer-die and jointly operating cylinder and piston therefor, a valve controlled conduit to said cylinder, laterally movable end-closing devices and means for successively opening and closing the same, and means carried by the hammer cylinder and adapted to first operate said opening and closing means and thereafter operate said conduit valve during each die-seating movement of the cylinder.

3. A link-welding machine comprising an anvil-die, a hammer-die and jointly movable operating cylinder and piston therefor, a valve-controlled conduit to said cylinder, laterally movable end-closing devices and mechanism for reversely operating the same, means carried by said hammer-cylinder for operating said conduit-valve, and an adjustable lever for said end-closing mechanism arranged in the path of said conduit-valve operating means and adapted to be actuated thereby substantially as set forth.

4. In a welding machine comprising an anvil-die and a hammer-die with jointly movable operating cylinder and piston, a valve-controlled compressed-air conduit having a nozzle arranged to discharge laterally at the welding point of said anvil-die during the descent of the hammer cylinder, said nozzle being closed simultaneously with the seating of the hammer-die.

5. In a link-welding machine comprising a horned anvil-die and a hammer-die, a laterally movable end-closing mechanism comprising a link-end engaging device pivotally mounted to one side of the anvil horn so as to swing in a horizontal plane and thereby close the link end laterally and longitudinally of the link.

6. In a link-welding machine comprising an anvil-die and laterally movable end-closing fingers, a hammer-die and carrying means therefor comprising a vertically movable column having a horizontal carrying-arm, and finger operating mechanism comprising a contact device arranged in the path of said column substantially as set forth.

7. In a link welding machine comprising an anvil die, a pneumatic hammer and die, and a fixed carrier column, a carrier mechanism for said pneumatic hammer comprising a movable carrier column having a horizontal carrier arm, said movable column being feathered to said fixed column to insure a limited vertical movement thereon and being adapted to turn upon the same when in raised position thereon.

8. In a link-welding machine comprising an anvil-die, a hammer-die, and laterally movable end-closing fingers, a laterally movable guard-plate above said anvil-die, and means carried by the hammer-die for shifting said guard-plate substantially as set forth.

9. In a link welding machine comprising an anvil-die, a hammer-die, and laterally movable end-closing fingers, a pivotally mounted spring-pressed guard plate arranged to normally overhang said anvil-die and means carried by the hammer-die for shifting said guard-plate substantially as set forth.

In testimony whereof, I affix my signature, in the presence of two witnesses.

FRANK H. HOWARD.

Witnesses:
D. M. STEWART,
W. G. STEWART.